(12) United States Patent
Schneider et al.

(10) Patent No.: US 10,484,726 B2
(45) Date of Patent: Nov. 19, 2019

(54) PLAYLIST ERROR TAGS FOR DELIVERY AND RENDERING OF STREAMED MEDIA

(71) Applicant: Apple Inc., Cupertino, CA (US)

(72) Inventors: Jordan B. Schneider, San Francisco, CA (US); Peng Zhou, Cupertino, CA (US); Roger N. Pantos, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 15/613,111

(22) Filed: Jun. 2, 2017

(65) Prior Publication Data
US 2018/0352017 A1    Dec. 6, 2018

(51) Int. Cl.
| | |
|---|---|
| *H04N 21/235* | (2011.01) |
| *H04N 21/482* | (2011.01) |
| *H04N 21/262* | (2011.01) |
| *H04L 29/06* | (2006.01) |
| *H04N 21/4425* | (2011.01) |
| *H04N 21/845* | (2011.01) |

(52) U.S. Cl.
CPC ......... *H04N 21/2353* (2013.01); *H04L 65/60* (2013.01); *H04N 21/26258* (2013.01); *H04N 21/4425* (2013.01); *H04N 21/4825* (2013.01); *H04N 21/8456* (2013.01)

(58) Field of Classification Search
CPC ................. H04N 19/66; H04N 19/103; H04N 21/85406; H04N 21/283; H04N 21/26258; H04N 21/8456; H04N 21/2353; H04N 19/44; H04N 19/577; H04N 19/89; H04N 19/172; H04N 19/30; H04N 19/159; H04L 65/607; H04L 65/602; H04L 65/608; H04L 65/4069; H04L 65/80
See application file for complete search history.

(56) References Cited

U.S. PATENT DOCUMENTS

| | | | |
|---|---|---|---|
| 2007/0083814 A1* | 4/2007 | Wilbrink .......... | G11B 20/00086 715/716 |
| 2008/0303823 A1* | 12/2008 | Yanagawa ............ | G10H 1/0008 345/467 |
| 2010/0257203 A1* | 10/2010 | Sun ..................... | G06F 16/4387 707/780 |
| 2011/0246621 A1* | 10/2011 | May, Jr. ............. | H04N 7/17318 709/219 |
| 2012/0072286 A1* | 3/2012 | Kilar ..................... | G06Q 30/02 705/14.55 |

(Continued)

*Primary Examiner* — Alina A Boutah
(74) *Attorney, Agent, or Firm* — BakerHostetler (57) ABSTRACT

The present disclose describes techniques for delivery and rendering of streamed media using error tags in a corresponding media playlist. The playlist may represent organization of the media item, providing information of coded media segments that constitute the media item. When segments of coded media are received for a media item, a determination may be made whether the coded media segments contain errors. When a coded media segment is encountered that does not contain an error, a playlist entry representing the coded media segment may be added to the playlist. When a coded media segment contains an error, a playlist entry may be added to represent this coded media segment. This playlist entry may indicate the segment error. The playlist may be stored for access by player device(s).

32 Claims, 4 Drawing Sheets

(56) References Cited

U.S. PATENT DOCUMENTS

| | | | |
|---|---|---|---|
| 2012/0110618 A1* | 5/2012 | Kilar | G06Q 30/02 725/34 |
| 2013/0067328 A1* | 3/2013 | Salyards | H04N 21/26258 715/716 |
| 2014/0010517 A1* | 1/2014 | Sheffler | H04N 9/79 386/226 |
| 2014/0281707 A1* | 9/2014 | Su | H04L 67/2842 714/18 |
| 2015/0089557 A1* | 3/2015 | Busse | H04N 21/23439 725/95 |
| 2016/0021164 A1* | 1/2016 | Chakarapani | G06F 16/783 709/224 |
| 2018/0103271 A1* | 4/2018 | Wang | H04N 19/66 |

* cited by examiner

FIG. 4
400

PLAYLIST ERROR TAGS FOR DELIVERY AND RENDERING OF STREAMED MEDIA

BACKGROUND

The present disclosure relates to techniques for managing access to media steamed by a computer network.

Video content, audio content, or both together are regularly provided to various viewing devices, such as smart phones and tablets, as streamed media. This media content typically undergoes several processing and transmission steps before ultimately being delivered to the viewing device. For example, media content may begin as raw media source data. The raw media source data may be then transmitted to a coder at which the media source data is encoded as a series of segments. The encoded segments thereafter may be sent to a distribution server that stores the encoded segments and generates corresponding playlists. The playlists may be provided to a viewing device to enable the viewing device to download and sequentially render the encoded segments.

However, various errors or defects in the media content may occur as it undergoes the above-described processes and transmissions. For example, a media feed of the media source data to the coder may be interrupted. In other cases, there may be an error in the encoding process, resulting in a corrupted segment. Such errors may disrupt the viewing experience of the media content. This particularly may be the case when an audio stream and a video stream are presented in synchronization with one another. Errors in one of the streams may cause a de-synchronization with the other stream.

Accordingly, the inventors perceive a need in the art for improved media streaming techniques that adapt to errors in a media stream.

BRIEF DESCRIPTION OF THE DRAWINGS

The foregoing and other aspects of various embodiments of the present disclosure will be apparent through examination of the following detailed description thereof, in conjunction with the accompanying drawing figures in which similar reference numbers are used to indicate functionally similar elements.

DETAILED DESCRIPTION

Embodiments of the present disclosure provide techniques for delivery and rendering of media items using error tags in a playlist file. The playlist may represent organization of the media item, providing information of coded media segments that constitute the media item. When segments of coded media are received for a media item, a determination may be made whether the coded media segments contain errors. When a coded media segment is encountered that does not contain an error, a playlist entry representing the coded media segment may be added to the playlist. When a coded media segment contains an error, a playlist entry representing this coded media segment may be added to the playlist. This playlist entry may indicate the segment error. The playlist may be stored at a distribution server for access by player device(s).

Figure 1:
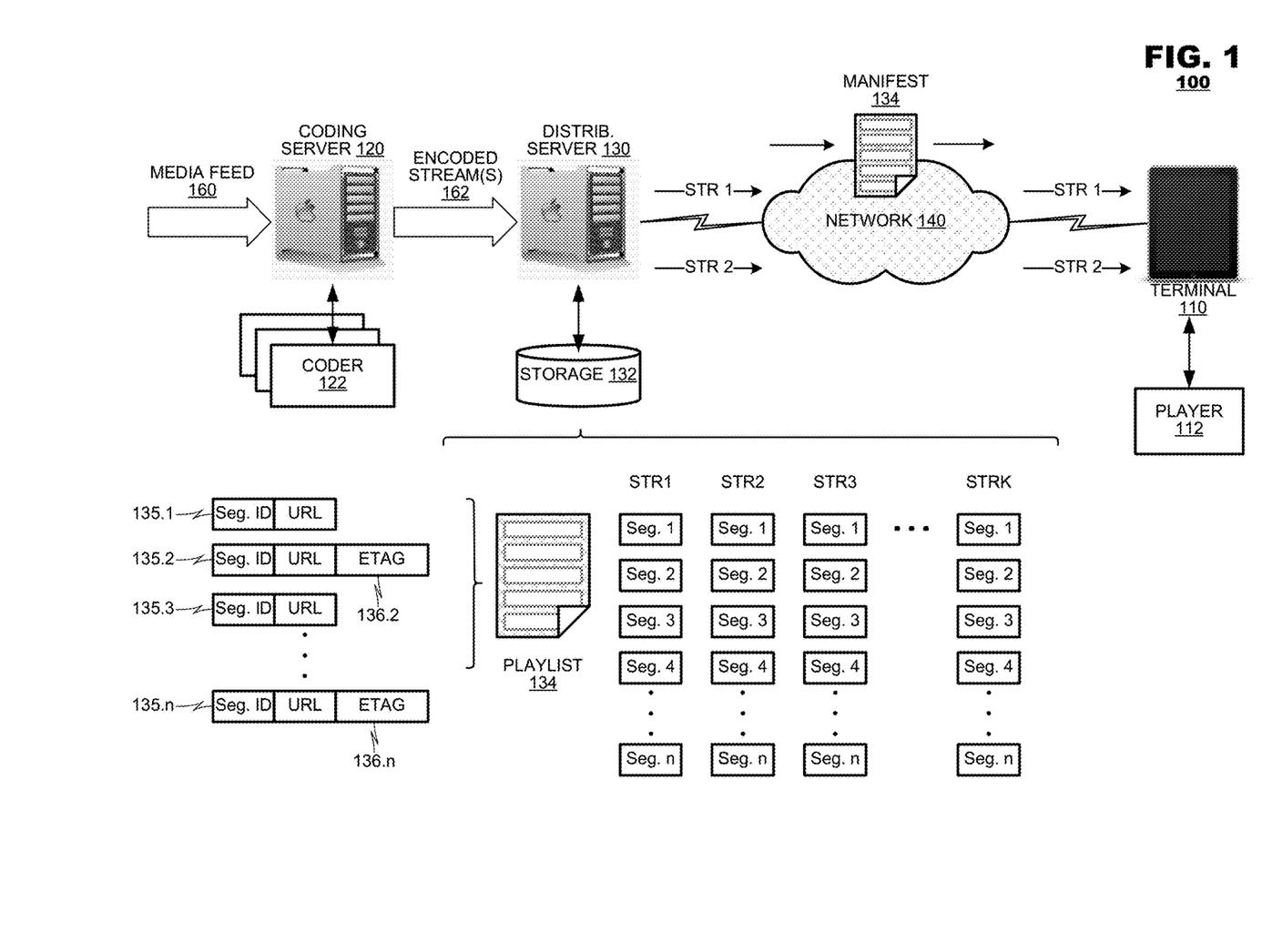
FIG. 1 is an illustration of an example system according to an embodiment of the present disclosure.

FIG. 1 is a simplified functional block diagram of an exemplary streaming system 100 according to an embodiment of the present disclosure. The system 100 may include a coding server 120, a distribution server 130, and a terminal device 110 provided in communication by a network 140. The coding server 120 may code an input media item for delivery to a terminal device 110. The distribution server 130 may manage distribution of the coded media item to terminal device(s) 110. The terminal device 110 may download and render elements of the media item.

The coding server 120 may receive media source data via a media feed 160. The media source data may include video source data and/or audio source data. The coding server 120 may utilize one or more coders 122 to encode the media source data and provide one or more encoded media streams 162 to the distribution server 130. Typically, media coding is performed according to a predetermined coding protocol and, as compared to the source media data, it achieves bandwidth compression. For example, video may be coded according to an ITU-T standard such as H.265 (commonly, "HEVC"), H.264 ("AVC") or another standardized coding protocol. Coded video data may be output from the coding server 120 packaged as a plurality of separate units, called "segments," for transmission to terminal devices 110.

The distribution server 130 may manage delivery of the media items coded by the coding server 120. The distribution server 130 may store coded media segments of each media item in local storage 132. The distribution server 130 also may generate playlist files 134 (also known as manifest files) that contain information about each media item that can be downloaded by a terminal device 110.

In many cases, a single media item (say, a video program) is stored by a distribution server 130 in several representations, called "streams." In the example of FIG. 1, a single media item is shown constituted by streams STR1-STRK. Some of the streams may represent variants of common media content. For example, a single media item may have several streams with different representations of video content of the item; the streams may vary according to bit rate, video coding format/standard, or resolution, for example. Moreover, a single media item may have several audio streams that vary, for example, according to bit rate, audio coding format/standard, or language. Each stream may comprise a respective plurality of segments, i.e., segment 1-segment n. Although FIG. 1 illustrates each stream having an identical number n of segments, in practice, different streams may (and do) have different numbers of segments.

The distribution server 130 further may store a playlist file 134 for each media item stored by the distribution server 130. The playlist file 134 may include data that describes a media item and the segments that are part of the media item. The playlist file 134 may comprise a respective segment identifier and a URL (i.e., a network location) at which the segment may be accessed and downloaded. To illustrate, an example playlist file 134 may include segment data entries 135.1-135.n describing the respective segments of one of the streams STR1-STRK. Although not illustrated in FIG. 1, the playlist file 134 may have entries for all segments of all the streams that make up the media item.

In an embodiment, the playlist file 134 further may include an error tag to identify a segment that may possess an error. Exemplary error tags 136.2 and 136.n for respective segment data entries 135.2 and 135.n are shown in FIG. 1; the playlist file 134 may likewise include respective error tags for other segments that have errors. The data of the error tag may indicate, if applicable, some defect with a segment. In one embodiment, error tags need not be provided for segments that do not possess errors. In another embodiment, however, error tags may be provided for every segment in a playlist file 134 and they may contain data that indicates an error state of the respective segment (e.g., "error" or "no error"). As will be discussed further herein, the terminal device 110 may perform rendering and playback operations based, at least in part, on the error tag in the playlist file 134 for any given coded segment.

Error tags may be set in response to a variety of operating circumstances. For example, an interruption may occur in the media feed 160 providing the media source data to the coding server 120. Thus, the coding server 120 may be unable to provide coded segment(s) corresponding to the missing media source data. Further, a segment error may result if there is an error or other failure with one or more of the coders 122 on the coding server 120. For example, a coder 122 may crash or otherwise become unavailable. In this case, the segments to which this coder 122 is assigned to code may be similarly missing from the encoded media stream 162 provided to the distribution server 130. As yet another example, media source data from the media feed 160 may be coded by the coding server 120, but some error in the coding process may render the resultant segment unusable for rendering and playback by the terminal device 110.

Download and rendering of media items may be performed as a client-directed operation. For example, a terminal device 110 begins media rendering by requesting a playlist file 134 for a desired media item, which is furnished by the distribution server 130. The terminal device 110 may select which of the streams STR1-STRK the terminal device 110 will render. During a single playback session, it is possible that the terminal device 110 will change its selection of streams that will be rendered. For example, operation conditions at the terminal device 110, such as loss of network bandwidth or resource contention, may cause the terminal device 110 to select lower-bandwidth or lower-complexity video streams than were initially selected. In another use case, an operator may change the audio representation to be used (switching audio commentary tracks on and off) or may enable/disable other streams (e.g., close captioning). The terminal device 110 may issue requests for segments of selected streams using network addresses identified by the playlist file 134 and, when the segments are received, it may render them.

In the case of error tags 136, a terminal device 110 may make its decisions regarding which segments are to be requested after consideration of such tags. For example, when an error is indicated for a coded segment of video in one stream, a terminal device 110 may determine whether to switch to a counterpart segment of another stream. The terminal device's 110 determination may be made in conjunction with other operating conditions, such as network bandwidth, available resources and the like. It may occur that a terminal device 110 determines that it is appropriate to switch to another stream, in which case the terminal device may "work around" the erroneous segment by requesting, receiving and rendering segments of another stream that does not possess an error. In another circumstance, the terminal device 110 may determine that it cannot switch to another stream, in which case the terminal device 110 may either request the segments that possess errors or engage some other activity (for example, perform error concealment).

The media streams (e.g., the stream STR1 and the stream STR2) provided to the terminal device 110 may comprise related content and the rendering and/or playback of the media streams may be synchronized at the terminal device 110. For example, one media stream may comprise a video media stream and the other media stream may comprise an audio media stream with audio content that should be synchronized with the video content of the video media stream, as is commonly the case with many television programs, movies, sports event presentations, and the like. The association between a video media stream and an audio media stream need not be on a one-to-one basis. Rather, a set of video media streams may be associated with a set of audio media streams. For example, a movie may be presented in any one of a variety of bit rates or resolutions while an associated audio track may be in English, Spanish, or French.

The terminal device 110 may represent media players 112 that download media packages from the distribution server 130, decode the coded media resources, and render them for playback. For example, the terminal device 110 may be realized in the form of a mobile device, such as a smart phone, a tablet computer, or a laptop. As another example, the terminal device 110 may be a desktop computer. As yet another example, the terminal device 110 may be a set-top cable box, a digital media player, a gaming console, or the like.

The network 140, via which the various components described herein communicate, may comprise a wired communication network, a wireless communication network, or a combination thereof. Examples of a wireless network may include a Wi-Fi network or a cellular network. Examples of a wired network may include a coaxial cable network, a fiber optic network, or an Ethernet network. The particular form and attributes of the network 140 are immaterial to the present disclosure unless otherwise indicated.

Figure 2:
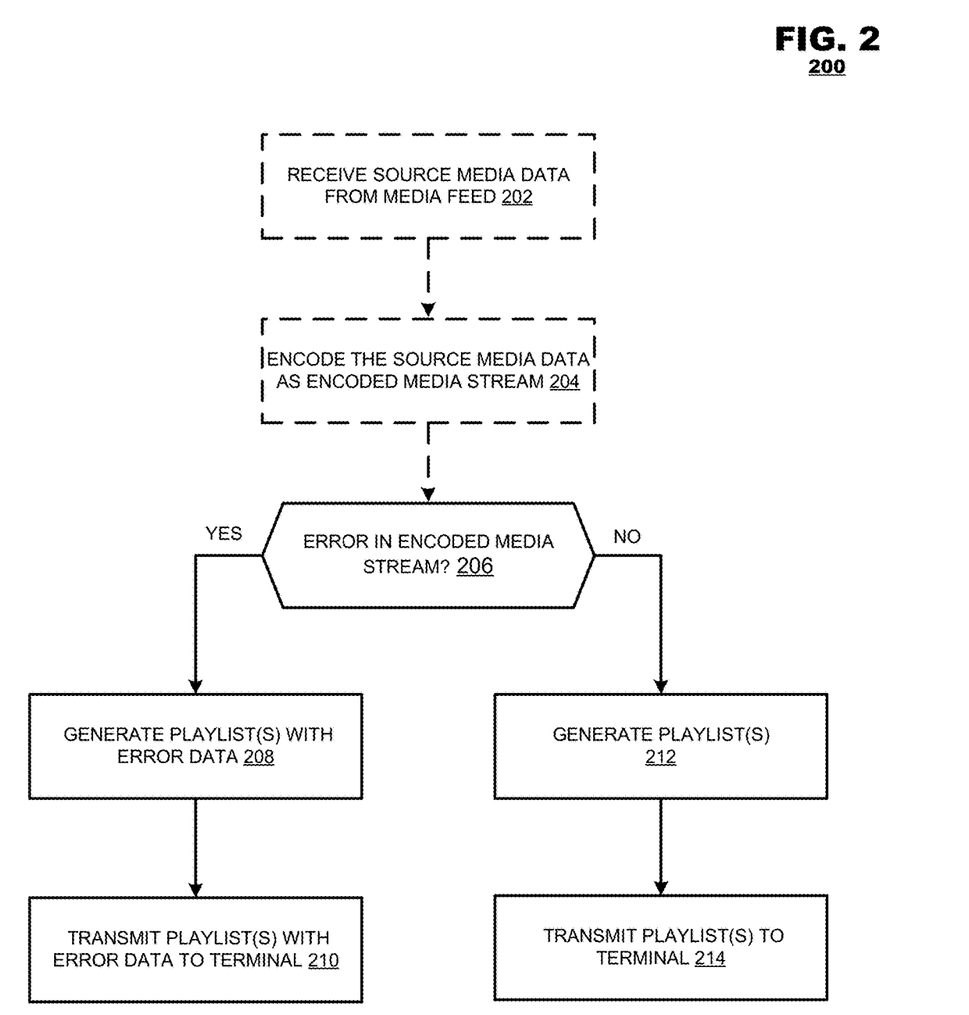
FIG. 2 is a flow diagram of an example method according to an embodiment of the present disclosure.

FIG. 2 illustrates a method 200 according to an embodiment of the present disclosure. The method 200 may determine if there are one or more errors in the encoded media stream (box 206). If there are one or more errors in the encoded media stream, the method 200 may generate or modify a playlist with data indicating the error(s) with respect to segment(s) in the encoded media stream (box 208). The playlist with data indicating the error(s) may be transmitted to a terminal device (box 210) for use in rendering and playback of the encoded media stream (subject to modification(s) necessitated by the error(s) in the encoded media stream). If no errors are present in the encoded media stream, the method 200 may generate a playlist as normal (i.e., without data indicating errors) (box 212) and transmit this playlist to the terminal device (box 214) for use in rendering and playback of the encoded media stream. The terminal device may perform such rendering and playback according to the playlist and error data represented therein (not shown).

Operation of the method 200 is expected to provide several advantages in networked media delivery systems. One benefit is that the effects of a disruption to a media feed and/or errors in encoding this media feed may be minimized. By providing data indicating error(s) with one or more encoded segments, a terminal device may be enabled to alleviate the effects of these errors in a viewing experience. For example, if an error is indicated for a segment or a number of segments, the terminal device may replace those segments with alternative segments. The alternative segments may include analogous segments having different attributes, such as bit rate, but common content as the replaced segment. This may allow the presentation of the program to continue despite the error, rather than presenting blank content or a presentation error.

Another benefit is seen, particularly in the case involving live video content and real-time delivery, by allowing the distribution server 130 to integrate the erroneous segments into a playlist using ordinary processing techniques. The method 200 doesn't require exception control, for example, to estimate when lost segments will reappear. Further, the user of error tags leverages existing client-driven selection of streams.

Yet another benefit realized by the present disclosure is a decrease in resource utilization of the various components involved. For example, the terminal device may refrain from repeated attempts to download a segment or series of segments and thus reduce the load on the distribution server and network bandwidth utilization.

The determination as to whether there are error(s) in the encoded media stream may be performed according to a variety of techniques. As one example, the segments of the encoded media stream may include or otherwise be associated with data indicating such an error. This error may be recognized, such as by the distribution server, and the playlist reflecting this error may be generated accordingly. As another example, the distribution server may analyze the segments of encoded media stream and determine if the segment exhibits some defect or, in some instances, whether the segment is absent from the encoded media stream altogether. The distribution server may determine that the segment is corrupt or contains null content, as some examples.

The one or more errors in the encoded media stream may result from a number of operational scenarios. As an example, such an error may be caused by a fault in the encoding process itself, such as a glitch in the coder. This may result in corrupted segments in the encoded media stream. Likewise, a coder on the coding server (or the coding server itself) may crash or be rendered otherwise inoperable, resulting in a coding interruption for that particular media stream while the coder recovers from the crash. As such, there may be a gap in the encoded media stream. As another example, an error or other failure in the upstream media feed my result in errors in the encoded media stream. For instance, a camera recording a live program may temporarily fail or an upstream network connection may be interrupted. Thus, the coder may be unable to generate corresponding segments in the encoded media stream. This may also cause a gap in the encoded media stream. A gap in an encoded media stream may refer to an absence of an encoded segment, null content in the encoded segment, or corruption in the encoded segment.

As indicated, if one or more errors are recognized in the encoded media stream, a playlist may be generated with data indicating these error(s), i.e., error data. The playlist may be generated by a distribution server, for example. The error data may correspond with one or more respective segments of the encoded media stream. Accordingly, the error data in the encoded media stream may be in the form of an error tag in the playlist entry for the effected segment. An example error tag 136 is shown in FIG. 1.

In some embodiments, the error data may indicate just that there is some defect with the corresponding segment. In this sense, the error data may assume a binary value indicating whether that the segment is usable or not. In other embodiments, the error data may include other supplemental information. The supplemental information may be included in the error tag in the playlist or the playlist entry may include an additional tag for the supplement information. As an example, the supplemental information may include an alternative network location (e.g., a URL) from which the terminal device may receive alternative media segments. The terminal device may render and play this alternative segment in lieu of attempting to render and play the indicated segment having an error. In some cases, successive encoded segments may include error data. Thus, as another example, the supplemental information may include a timing element reflecting the number (or estimate thereof) of successive segments with errors or the aggregate time period (of estimate thereof) affected by the errors.

After the playlist is generated, it is provided to the terminal device for use in rendering and playback of the encoded media stream. The terminal device may recognize the error data in the playlist and alter the rendering and playback of the media stream accordingly.

In an example, when the terminal device recognizes error data for a particular segment, the terminal device may instead download and use another alternative segment that is related to the error segment with respect to content. For instance, the alternative segment may represent common content with the error segment but having one or more different attributes, such as a different bit rate, resolution (for video segments), coding format, or language (for audio segments). Thus, if an error segment has a 1080p resolution, the other related segment used in its stead may have a 480p resolution.

In another example, when the playlist entry for a particular segment indicates an error with the segment, the terminal device may not attempt to download this segment from the distribution server. If the segment is just one of several successive segments with errors, the error data for this segment may indicate the number of subsequent segments also with errors. The terminal device may likewise not attempt to download these successive segments until reaching a segment indicated (or estimated) as error-free. By refraining from attempting to download these segments with errors, load on the distribution server and network bandwidth may be reduced.

In another example of how a terminal device may adapt rendering and playback according to the playlist with error data, the terminal device may display a local alternative segment in place of the segment with errors. The local alternative segment may be referred to in some instances as "slate" content. For example, the local alternative segment may include a "technical difficulty experienced" message or the like. This response to the error data may be particularly apt when the terminal device or its player use rendering and playback technology that is not as recent as or different than its more modern counterparts.

Further, if the error data also indicates a number (or estimate) of successive segments with errors, the terminal device may be only required to access the local alternative segment a single time while rendering those successive segments. In some embodiments, the alternative segment, including "slate" content, may be downloaded from an external source, such as the distribution server, rather than initially being stored locally on the terminal device. In this case, the terminal device may also benefit from the data indicating the number of successive segments with errors since the terminal device may download the alternative segment only a single time and then use this now-local alternative segment to replace the subsequent segments with errors.

In a further embodiment, a distribution server 130 may replace an erroneous segment with a segment having alternate content. For example, the distribution server 130 may create a segment having a duration of the erroneous segment that contains slate content or some other alternate content. Similarly, when a distribution server 130 detects that a segment is missing from a data feed provided by a coding server 120, the distribution server 130 may build a segment having alternate content, again from slate content, null content or some other alternate content. In an embodiment, the distribution server 130 may store different instances of slate content that has been coded according to common coding protocols and for commonly-used devices and may build an alternate segment for example, as an intra-coded frame of such content followed by a sufficient number of SKIP-coded frames to build a segment of sufficient duration to substitute for a missing segment.

In practice, the method 200 may receive media source data from a media feed (box 202). This media source data may be thereafter encoded as an encoded media stream comprising a plurality of encoded media segments (box 204). The method 200 may then proceed to box 206, as described above, wherein the method 200 may determine if there one or more errors in the encoded media stream.

The media source data referenced in box 202 may be received by a coding server via a media feed and thereafter encoded by the coding server to generate the encoded media stream comprising the plurality of media segments. Often times, the media feed may comprise a number of related media source data feeds. For example, several instances of media source data may include common video content represented in several bit rates or video resolutions. Similarly, several instances of media source data may comprise common audio content presented in several different languages. There also may exist a relationship between an audio media feed and a video media feed such that the two are intended for synchronized presentation.

As indicated, the media source data may be source video data or source audio data. Likewise, the encoded media stream may be an encoded video stream or an encoded audio stream. The encoded media stream may be generated according to any known encoding standard, including H.264 or H.265 for video source data and AAC, MP3, or AC-3 for audio source data. The encoded media stream may be subsequently provided, such as to the distribution server, for the determination of whether the encoded media stream includes one or more errors, as well as to effectuate the additional steps of the method 200.

Figure 3:
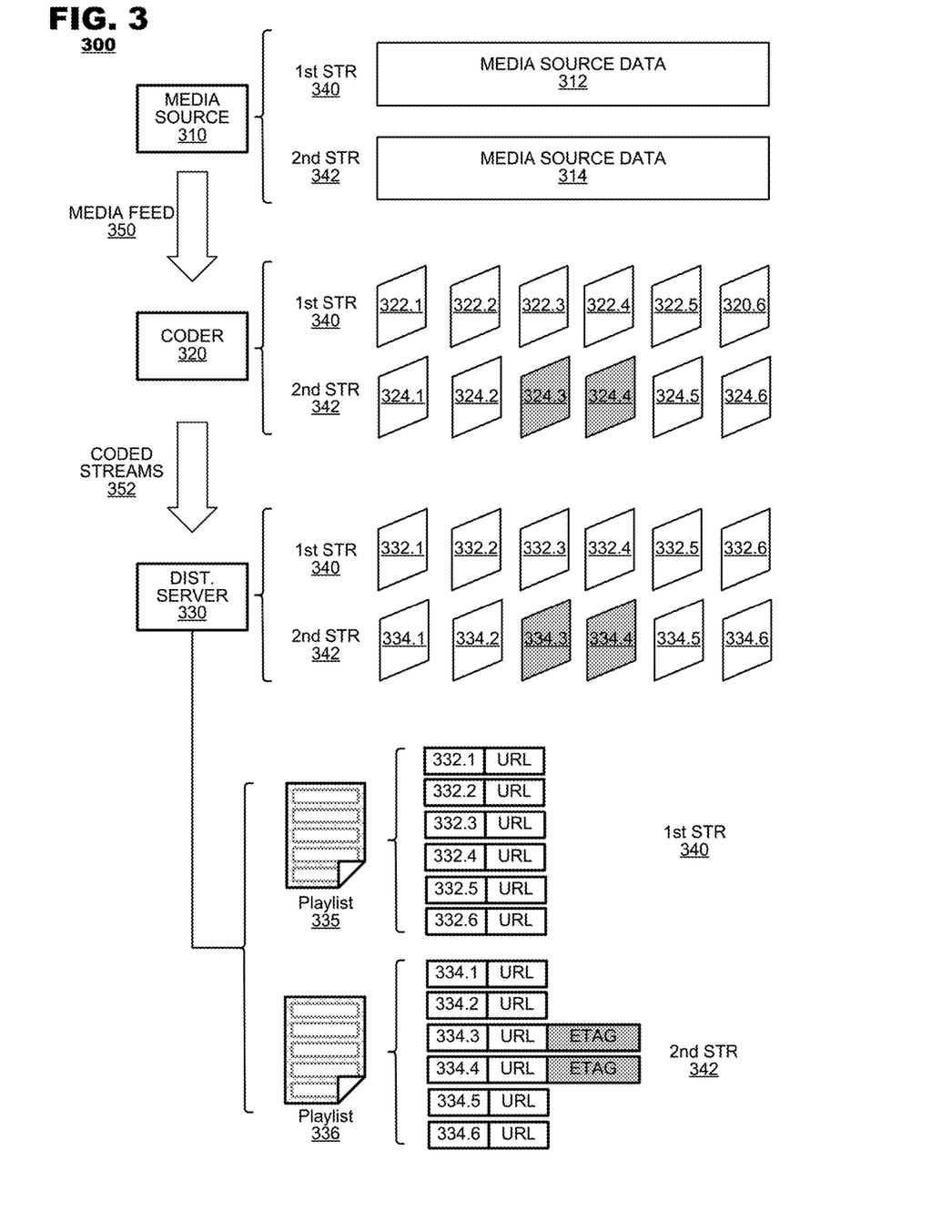
FIG. 3 is an illustration of an example system according to an embodiment of the present disclosure.

FIG. 3 illustrates an example use case scenario of an embodiment of the present disclosure. The system 300 may include a media source 310, a coder 320, and a distribution server 330. A first stream 340 of first media content and a second stream 342 of second media content are sent from the media source 310 to the coder 320 via the media feed 350. From there, the first and second stream 340, 342 are encoded by the coder 320 into encoded segments and sent, via the coded streams 352, to the distribution server 330. The encoded segments of the first and second streams 340, 342 may be analyzed at the distribution server 330 to determine if there are any errors in the encoded segments. According to this determination, the distribution server 330 may organize the encoded segments into playlists, with any segments having errors indicated in the playlists. The encoded segments, if possible, are made available to stream to a terminal device (not shown) for rendering and playback.

The first and second streams 340, 342 represent instances of media content as they are sequentially transferred between and processed by the components of the system 300 according to the methods and techniques of the present disclosure. The first and second streams 340, 342 may together represent an audio-visual program (or portion thereof). The first and second streams 340, 342 may be synchronized when played at a terminal device. As such, the first stream 340 may embody the audio component of the program and the second stream 342 may embody the video component of the program.

Initially, the first and second streams 340, 342 derive from the media source 310 and are in the form of media source data. Thus, the first stream 340 is embodied at the media source 310 by the media source data 312. The second stream 342 is embodied at the media source 310 by the media source data 314.

Thereafter, the media source data 312, 314 may be sent from the media source 310 to the coder 320 via the media feed 350. The coder 320 may code the media source data 312, 314 as encoded segments. Here, the media source data 312, representing the first stream 340, may be encoded as encoded segments 322.1, 322.2, 322.3, and so forth. Likewise, the media source data 314 may be encoded as encoded segments 324.1, 324.2, 324.3, and so forth. However, in this exemplary use case, an error occurs with respect to the encoded segments 324.3 and 324.4. This error may be the result of a coding error, an interruption in the media feed of the media source data 314, or other cause discussed herein. The error may signify corruption to the encoded segments 324.3, 324.4, the absence of the encoded segments 324.3, 324.4, or null content in the encoded segments 324.3, 324.4, to name some examples.

The first and second streams 340, 342, and encoded segments thereof, may be sent to the distribution server 330 via the coded streams 352, at which they will be stored as encoded segments 332.1, 332.2, etc. and encoded segments 334.1, 334.2, etc. The distribution server 330 may analyze the encoded segments to determine any errors with the encoded segments. In this case, the distribution server 330 may identify the encoded segments 334.3 and 324.4 as having errors. Accordingly, the playlist file 336 generated by the distribution server 330 for the second stream 342 may indicate these errors. In particulate, the error tag in the respective entries in the playlist file 336 for the encoded segments 334.3 and 334.4 include data to indicate the error. Since no error is identified with respect to the encoded segments 334.1, 334.2, 334.5, and 334.6, the error tags in the respective playlist file entries indicate that no error is present for these encoded segments. Similarly, since no errors are detected in the encoded segments of the first stream 340, the errors tags in the playlist file 335 indicate that these encoded segments are free of error.

Upon request from a terminal device, the playlist files 335, 336 may be transmitted to the terminal device. The terminal device may perform rendering and playback of the streams 340, 342 based on the error indications in the playlist file 336 for segments 334.3 and 334.4. For example, the terminal device may select and download alternative segments to replace the segments 334.3 and 334.4 in playback. The various techniques by which the terminal device may address segment error are described in greater detail herein.

Because no errors are indicated in the error tags of the playlist file 335 for the first stream 340, the terminal device may render and playback these segments as normal. When the first and second streams 340, 342 are played in sync (recalling that the first and second streams 340, 342 may represent complementary audio and video content), the playback of the second stream 342 may be maintained while the terminal device makes appropriate segment adaptations to address the errors in the segments of the second stream 342. Since the playback of the second stream 342 is continued, rather than delaying playback until an error-free segment is available, this may maintain the synchronized playback of the first and second streams 340, 342.

Figure 4:
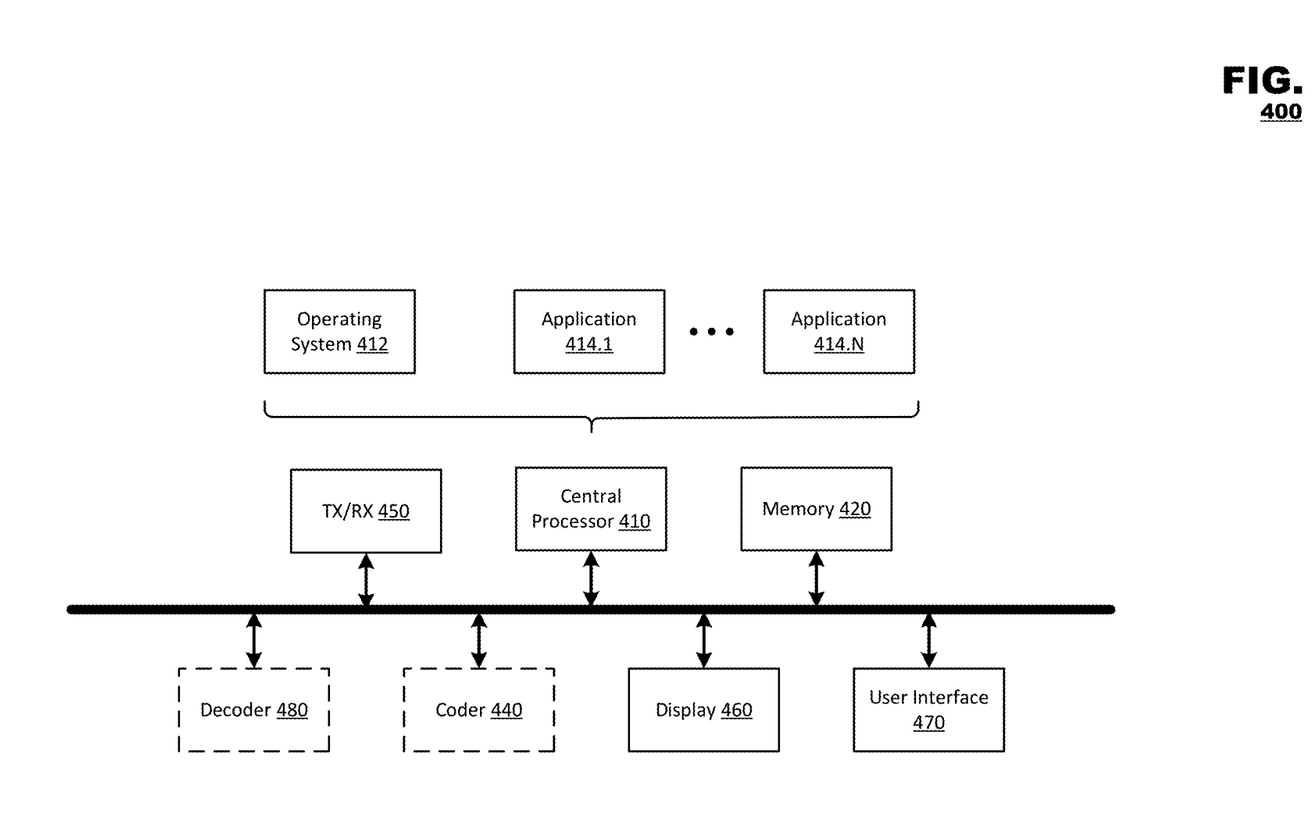
FIG. 4 is an illustration of an example computing system according to an embodiment of the present disclosure.

The techniques described herein may be performed by a central processor of one or more computer systems. FIG. 4 illustrates an exemplary computer system 400 that may perform such techniques. For example, the coding server 120, the distribution server 130, and the terminal of FIG. 1 may be realized in the form of the computer system 400. The computer system 400 may include a central processor 410 and a memory 420. The central processor 410 may read and execute various program instructions stored in the memory 420 that define an operating system 412 of the system 400 and various applications 414.1-414.N. For example, one of the applications 414.1-414.N may comprise the coder 122, an application of the distribution server 130 used to detect encoded segments with errors, and/or the player 112 of FIG. 1 The program instructions may cause the processor to perform the various media segment management techniques to effectuate playback of those segments, as described herein.

As indicated, the memory 420 may store program instructions that, when executed, cause the processor 410 to perform the techniques described hereinabove. The memory 420 may store the program instructions on electrical-, magnetic- and/or optically-based storage media. The memory may comprise volatile and/or non-volatile memory. As a further example use of the memory 420, the memory 420 may realize the storage 132 of FIG. 1. Thus, the memory 420 may be configured to store encoded segments and corresponding playlist files.

The system 400 may possess other components as may be consistent with the system's role as a media source, a media playback device, or both. The system 400 may possess a coder 440 to perform video coding on one or more media segments and a transmitter 450 (shown as TX) to transmit data out from the system 400. The coder 440 may be provided as a hardware device (e.g., a processing circuit separate from the central processor 410) or it may be provided in software as an application 414.1.

In a role as media playback device, the system 400 may possess a receiver 450 (shown as RX), a decoder 480, a display 460, and user interface elements 470. The receiver 450 may receive data and the decoder 480 may decode the data. For example, the terminal device 110 of FIG. 1 may receive encoded media segments from the distribution server 130 of FIG. 1 and decode those encoded media segments for playback. The display 460 may be a display device on which decoded media segments may be rendered. The user interface 470 may include component devices (such as motion sensors, touch screen inputs, keyboard inputs, remote control inputs and/or controller inputs) through which operators input data to the system 400.

Several embodiments of the present disclosure are specifically illustrated and described herein. However, it will be appreciated that modifications and variations of the present disclosure are covered by the above teachings and within the purview of the appended claims without departing from the spirit and intended scope of the disclosure.

We claim:

1. A method, comprising:
   responsive to received segments of coded media and a playlist that describes a media item to which the coded media belongs, determining which coded media segments contain errors;
   for a first coded media segment that does not contain an error, adding a first entry to the playlist, wherein the first entry represents the first coded media segment;
   for a second coded media segment that contains an error, adding a second entry to the playlist, wherein the second entry represents the second coded media segment, and wherein the second entry indicates the segment error; and
   storing the playlist for access by a player device.

2. The method of claim 1, wherein the second entry includes a tag indicating the segment error.

3. The method of claim 1, wherein the first entry to the playlist indicates that the first coded media segment does not contain an error.

4. The method of claim 1, wherein the error of the second coded media segment is caused by null content in the second coded media segment.

5. The method of claim 1, wherein the error of the second coded media segment is caused by corruption in the second coded media segment.

6. The method of claim 1, wherein the second coded media segment is an expected media segment and the error indicates the absence of the expected second coded media segment.

7. The method of claim 1, wherein the second entry to the playlist comprises a network address of an alternate segment to the second coded media segment.

8. A method comprising:
   determining whether an encoded media stream contains a segment error;
   if the encoded media stream contains a segment error, modifying a playlist for the encoded media stream to include data indicating the segment error; and
   transmitting the modified playlist to a terminal device for rendering at least a portion of the encoded media stream based on the data indicating the segment error.

9. The method of claim 8, wherein the segment error corresponds to a segment of the encoded media stream.

10. The method of claim 9, wherein the data indicating the segment error is represented in an error tag in a playlist entry for the segment.

11. The method of claim 8, wherein the segment error is caused by a coding error.

12. The method of claim 8, wherein the segment error is caused by an inoperability of a coder for the encoded media stream.

13. The method of claim 8, wherein the segment error is caused by an absence of media source data from which the encoded media stream is derived.

14. The method of claim 8, further comprising:
   if the encoded media stream does not contain a segment error, modifying the playlist to include data indicating that the segments of the encoded media stream are error-free.

15. The method of claim 8, wherein the data indicating the segment error further indicates a network location of a second segment for use as an alternative to a segment corresponding to the segment error.

16. The method of claim 15, wherein the second segment represents content common with that of the segment corresponding to the segment error.

17. The method of claim 16, wherein the second segment has at least one attribute different than that of the segment corresponding to the segment error, wherein the at least one attribute comprises at least one of a coding format, a bit rate, a resolution, and a language.

18. The method of claim 8, wherein the segment error corresponds to a plurality of successive segments in the encoded media stream.

19. The method of claim 18, wherein the data indicating the segment error further indicates an aggregate duration based on the respective durations of the plurality of successive segments.

20. The method of claim 8, wherein the encoded media stream is an encoded audio stream.

21. The method of claim 8, wherein the encoded media stream is an encoded video stream.

22. A method comprising:
receiving a playlist for a media item, wherein the playlist identifies segments of coded media organized according to different streams;
selecting a stream to play;
determining whether coded media segments of the selected stream have tags associated with them identifying an error;
for a first coded media segment that is not identified as having an error, initiating retrieval of the first coded media segment using information specified in the playlist;
for a second coded media segment that is identified as having an error, determining whether to switch to a counterpart coded media segment from another stream; and
when the determination is to switch, initiating retrieval of the counterpart coded media segment using information specified in the playlist.

23. The method of claim 22, wherein the information specified in the playlist comprises a network address.

24. The method of claim 22, wherein when the determination is not to switch, initiating retrieval of the second coded media segment using information specified in the playlist.

25. The method of claim 24, wherein the retrieval of the second coded media segment results in an error.

26. The method of claim 22, wherein when the determination is not to switch, rendering alternate content of the second coded media segment at a player device.

27. The method of claim 26, wherein the alternate content is stored locally at the player device.

28. The method of claim 22, wherein when the determination is not to switch, suspending rendering of content corresponding to the selected stream for a duration corresponding to a duration of the second coded media segment.

29. The method of claim 22, wherein the counterpart coded media segment has at least one attribute different than that of the second coded media segment, wherein the at least one attribute comprises at least one of a coding format, a bit rate, a resolution, and a language.

30. A non-transitory computer-readable medium storing instructions that, when executed by a processor, effectuate operations comprising:
receiving a playlist for a media item, wherein the playlist identifies segments of coded media organized according to different streams;
selecting a stream to play;
determining whether coded media segments of the selected stream have tags associated with them identifying an error;
for a first coded media segment that is not identified as having an error, initiating retrieval of the first coded media segment using information specified in the playlist;
for a second coded media segment that is identified as having an error, determining whether to switch to a counterpart coded media segment from another stream; and
when the determination is to switch, initiating retrieval of the counterpart coded media segment using information specified in the playlist.

31. A computing device comprising:
a processor;
a memory in mutual communication with the processor and storing instructions that, when executed by the processor, effectuate operations comprising:
receiving a playlist for a media item, wherein the playlist identifies segments of coded media organized according to different streams;
selecting a stream to play;
determining whether coded media segments of the selected stream have tags associated with them identifying an error;
for a first coded media segment that is not identified as having an error, initiating retrieval of the first coded media segment using information specified in the playlist;
for a second coded media segment that is identified as having an error, determining whether to switch to a counterpart coded media segment from another stream; and
when the determination is to switch, initiating retrieval of the counterpart coded media segment using information specified in the playlist.

32. A method, comprising:
receiving, at a media distribution server, streams of coded media data, the streams representing a common media item and partitioned respectively into segments,
determining which segment(s) contain coded media data errors;
generating a playlist representing the streams of the media item in which:
when a segment does not contain a coded media data error, an entry for the respective segment identifies an ID of the segment and a network location from which the respective segment can be retrieved;
when a segment contains a coded media data error, an entry for the respective segment identifies an ID of the segment, a network location from which the respective segment can be retrieved, and a field containing an error identifier; and
storing the playlist for access by a player device.

* * * * *